Figure 1:
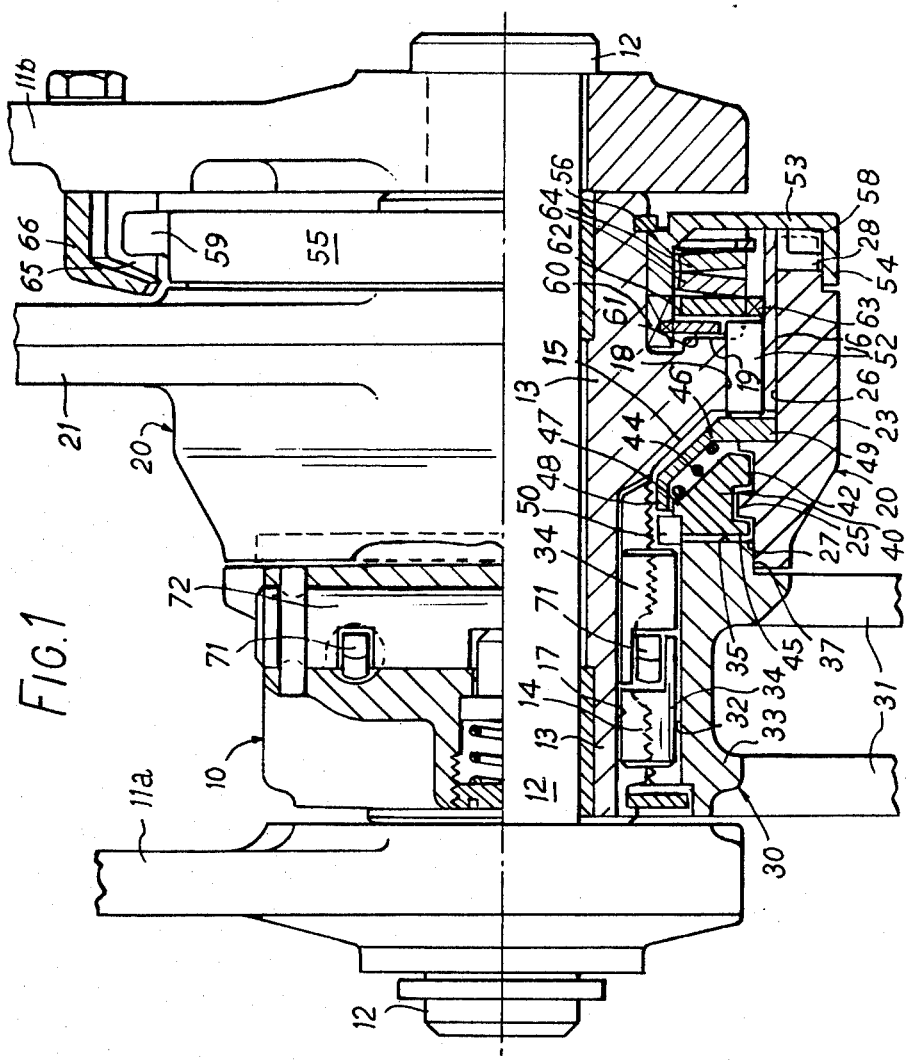

United States Patent [19]

Tregoning

[11] 4,234,064
[45] Nov. 18, 1980

[54] SLACK ADJUSTER MEANS
[75] Inventor: Geoffrey R. Tregoning, London, England
[73] Assignee: Westinghouse Brake & Signal Co. Ltd., England
[21] Appl. No.: 1,420
[22] Filed: Jan. 8, 1979
[30] Foreign Application Priority Data
  Jan. 6, 1978 [GB] United Kingdom ............... 00431/78
[51] Int. Cl.³ ............................................. F16D 65/56
[52] U.S. Cl. ........................ 188/196 BA; 188/79.5 K; 188/71.9
[58] Field of Search .......... 188/71.9, 79.5 K, 196 BA, 188/202

[56] References Cited
U.S. PATENT DOCUMENTS

| 1,860,770 | 5/1932 | Bugatti | 188/79.5 K |
| 3,211,263 | 10/1965 | Harrison | 188/196 BA |
| 3,467,228 | 9/1969 | Knights | 188/196 BA |
| 3,669,221 | 6/1972 | Hase | 188/196 BA X |

Primary Examiner—Duane A. Reger
Attorney, Agent, or Firm—Larson, Taylor and Hinds

[57] ABSTRACT

A slack adjuster for railway brakes has an input member to which a brake force is applied and an output member movable coaxially therewith, a coupling element via which a brake force is transmissible between the two members and which is positively engaged with one of the members via a cooperating helical engagement means and is engageable with the other member via clutching faces which are retained in force transmitting engagement by the reaction forces produced by the helical engagement means when a force is transmitted between the members for a brake application, the clutching faces being disengageable when such reaction forces are removed to permit relative rotation of the members and enable wear or slack in the brake rigging to be taken up.

11 Claims, 8 Drawing Figures

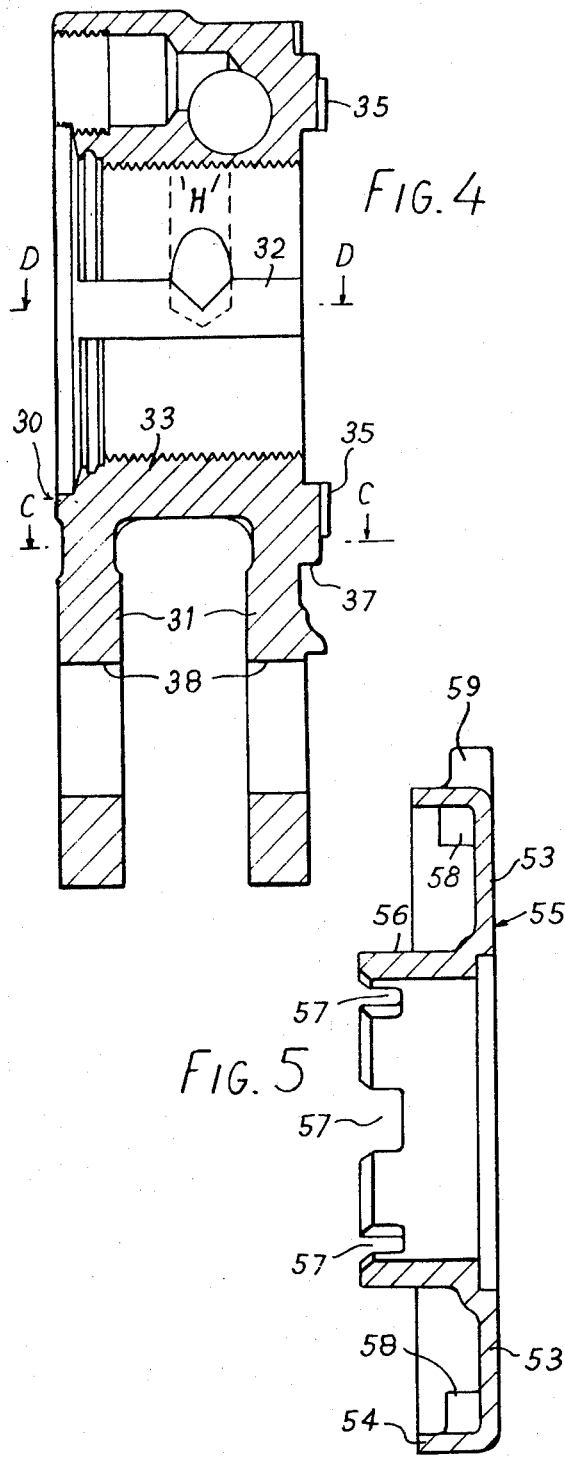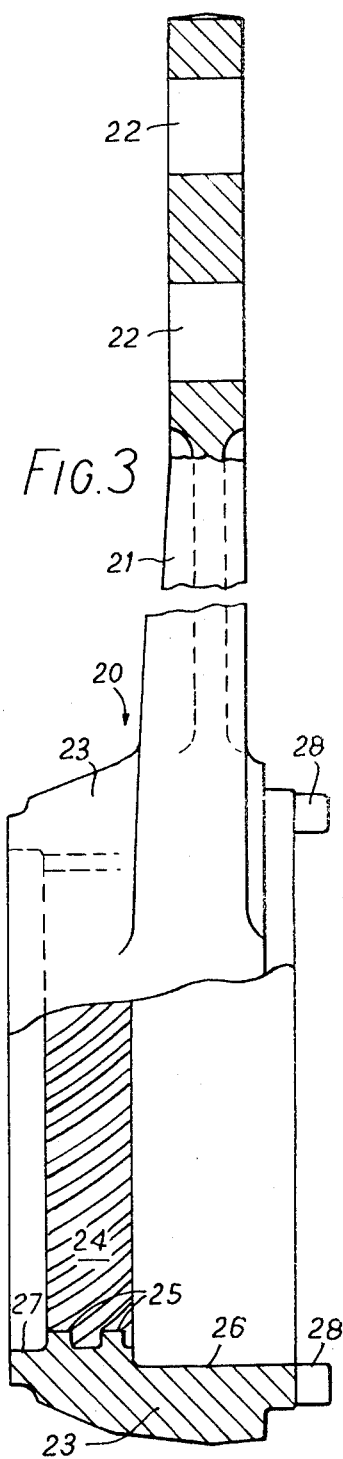

SLACK ADJUSTER MEANS

This invention relates to slack adjuster means, especially but not exclusively for friction brake apparatus, e.g. for railway vehicle braking.

Friction brake apparatus is well known in the field of railway vehicle braking to comprise a brake force applying member provided with a brake block or pad of friction material urged against a wheel (or a disc attached to the wheel or its axle for rotation therewith) by the braking operation of a brake force actuator that is linked or coupled to the brake force applying member via slack adjusting means, the latter automatically adjusting or compensating for slack arising due to wearing away of the friction material of the block or pad. The brake force actuator and the slack adjusting means may be separate mechanisms or, alternatively, may be provided in combination as a brake force supplying arrangement.

Slack adjusting means for such apparatus has been disclosed in connection with UK Patent Application No. 42067/76. Such slack adjusting means provides for automatic slack adjustment or compensation to be effected along a linear path. It is however also considered desirable to provide slack adjusting means that can provide for automatic slack adjustment or compensation to be effected along an arcuate path.

According to this invention, there is provided slack adjustment means to provide for automatic slack adjustment or compensation along an arcuate path, the slack adjustment means comprising an input member movable arcuately in a first plane, an output member movable arcuately in a second plane parallel to or coplanar with the first plane, and a coupling element for transmitting a braking force from the input member to the output member, characterised in that the input and output members are constrained against relative displacement in a direction transverse to the said first and second planes, and in that the element is positively engaged with one of said members via co-operating helical engagement means (e.g. helical keying means) and the element is engageable or engaged with the other of said members via co-operable clutch faces arranged to be retained in force-transmitting engagement by the reaction forces in the co-operating helical engagement means when the said members tend to rotate relatively in one direction, and to be disengageable as said reaction forces are removed or relieved when the said members tend to rotate relatively in the opposite direction thereby to permit relative rotation, corresponding to the slack to be taken up, between said element and said other member.

The helical engagement means may comprise helical keying means formed by helically interengaged grooves and projections, e.g. meshing gear teeth or co-operating grooves and splines or keys.

Preferably, the input member and the output member are each angularly movable about a common axis, and the coupling member is movable longitudinally of said common axis to disengage said co-operable clutch faces. Advantageously, one member has a tubular portion formed internally with a helical groove or projection co-operating with a corresponding helical projection or groove formed on the outer surface of the coupling element, the said element being disposed within the tubular portion with a radial end face of said element adjacent a radial end face of the other member, the two said radial end faces constituting the aforesaid clutch faces and the co-operating groove and projection constituting the aforesaid helical engagement means. Alternatively, one member may have a tubular portion formed externally with a helical groove or projection co-operating with a corresponding helical projection or groove formed on the inner surface of the coupling element, the latter encompassing the tubular portion with a radial end face of said element adjacent a radial end face of the other member, the two said radial end faces constituting the aforesaid clutch faces and the co-operating groove and projection constituting the aforesaid helical engagement means. Preferably, in either case, said one member is constituted by the said input member and said other member is constituted by the said output member. Alternatively, in either case, the said one member may be constituted by the said output member and the said other member may be constituted by the said input member.

Preferably, the slack adjusting means is provided with clearance sensing means to sense that a predetermined clearance between a brake block or pad and a wheel or disc has been reached during the release of the brakes. Preferably, the clearance sensing means comprises a clearance control element, a clutch to couple the clearance control element to one of said members (advantageously the said input member) for movement therewith and disengagement means for said clutch sensitive to the reaction forces acting to constrain the input and output members against said relative displacement for disengaging said clutch and/or permitting relative movement between the clearance control element and said one member when the reaction forces exceed a predetermined value.

Figure 2:
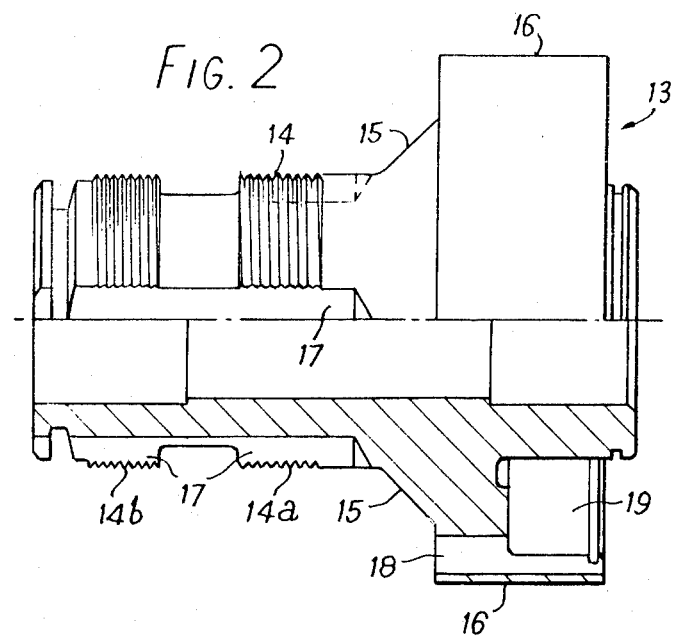
Figure 2A:
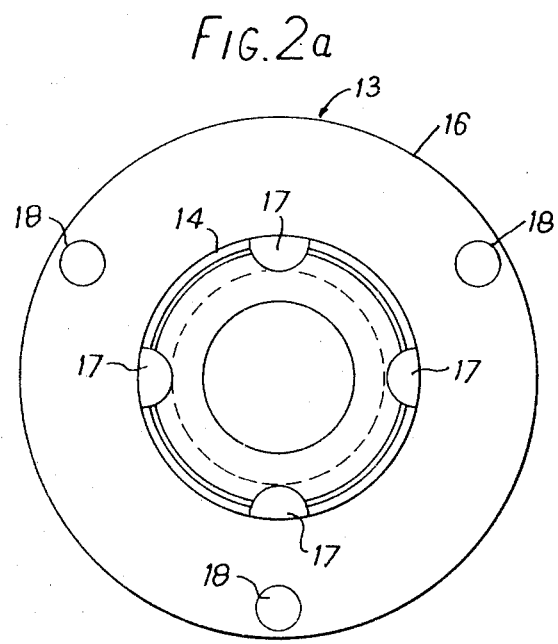
Figure 6:
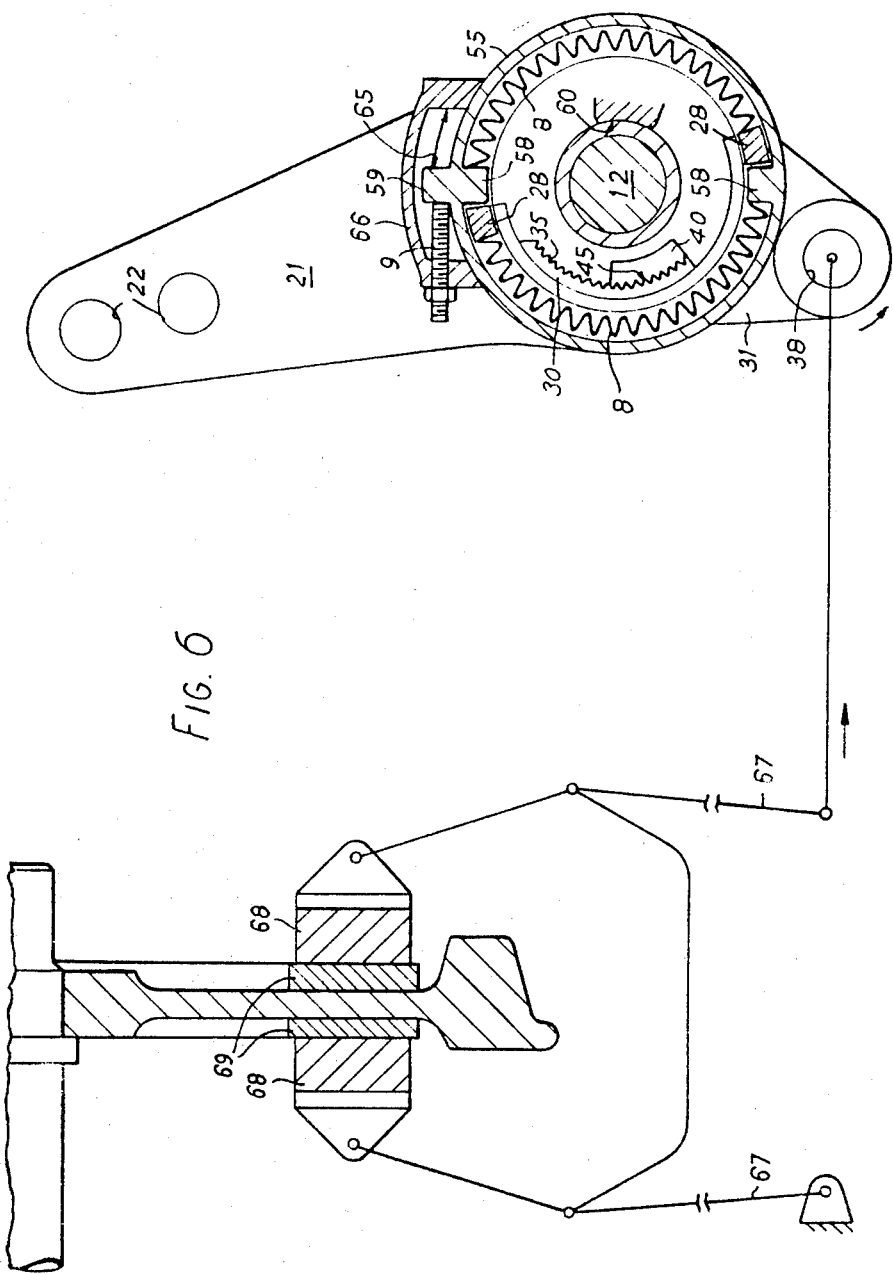
Figure 7:
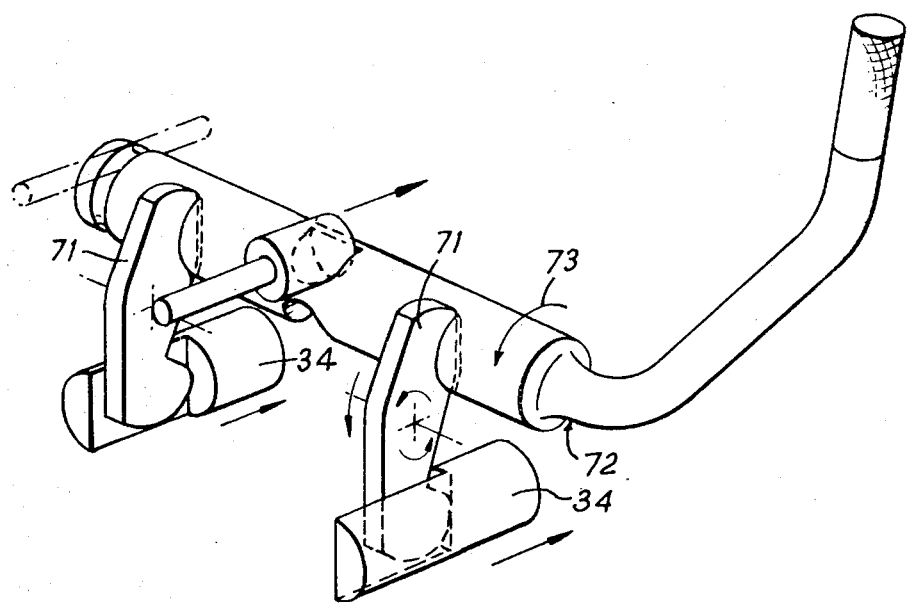

By way of non-limiting example, the slack adjuster according to this invention will now be described with reference to the accompanying drawings of which FIG. 1 is a partly sectioned side elevation of the exemplary slack adjuster 10, FIG. 2 is a partly-sectioned side elevation of a hollow shaft 13 of the slack adjuster 10, FIG. 2a is an end elevation of the hollow shaft 13 viewed from the left of FIG. 2, FIG. 3 is a partly-sectioned side elevation of an input member 20 of the slack adjuster 10, FIG. 4 is axial section through an output member 30 of the slack adjuster 10, FIG. 5 is an axial section through a cap member 55 of the slack adjuster 10, FIG. 6 is a schematic, partly-sectioned, end view of the slack adjuster 10 incorporated in friction brake apparatus for a railway vehicle, and FIG. 7 is a schematic perspective view of a resetting mechanism for the slack adjuster 10.

As shown in FIG. 1, two parallel elongate frame members 11a, 11b are attached by one end (not shown) to the chassis of a railway vehicle, the other ends of the frame members mounting between them a pin 12 which provides an axis of rotation for the angularly movable parts of the slack adjuster 10. A hollow shaft 13 is rotatably mounted on the pin 12, the shaft 13 having its external surface provided with two portions 14, 16 of differing diameter interconnected by a frusto-conical portion 15. The smaller diameter surface portion 14 is screw-threaded at the two axially-spaced regions 14a and 14b (FIG. 2), the threads being interrupted at two equi-angularly spaced locations by grooves 17 of generally semi-circular cross-section extending the length of surface portion 14. The larger diameter surface portion 16 of shaft 13 is smoothly cylindrical, three equi-angularly spaced bores 18 extending through the wider part of shaft 13 just inwardly of this cylindrical surface portion 16. The endface of shaft 13 adjacent cylindrical surface portion 16 is provided with an annular recess 19 the outer wall of which intersects the three bores 18 through the axis of each bore.

An input member 20 is rotatably mounted on the cylindrical surface portion 16 of shaft 13 for angular movement about the axis of pin 12. As best shown in FIG. 3, the input member 20 comprises a lever arm 21 which is provided at one end with two holes 22 and which, at its other end, is integral with a hub 23 having two inner surface portions 24, 26 of differing diameters. The larger diameter surface portion 26 is smoothly cylindrical and provides a bearing fit on the surface portion 16 of shaft 13. The smaller diameter surface portion 24 is formed with multi-start helical gear teeth 25, preferably of 45° pitch angle, and with a smoothly cylindrical region 27. The endface of hub 23 adjacent surface portion 26 is provided integrally with two diametrically opposite lugs 28.

An output member 30 having an internally screw-threaded hub 33 integral with a bifurcated lever arm 31 (see FIG. 4) is mounted by hub 33 on the screw-threaded surface portion 14 of shaft 13. The internal screw-thread of hub 33 is interrupted at two equi-angularly spaced locations by axial grooves 32 of generally semi-circular cross-section. The output member 30 has its hub 33 threaded on to shaft surface portion 14 and is locked thereto, for angular movement with shaft 13 about the axis of pin 12, by dowel pins 34 fitting into the bores formed by aligned pairs of grooves 17, 32. The hub 33 has one end face 35 formed as a radial clutch face by a plurality of radiating groove-and-ridge corrugations of V-shaped cross-section, and also has a smoothly cylindrical stepped region 37 rotatably slidable on the smoothly cylindrical region 27 of input member 20.

An annular coupling element 40 is provided between the input member 20 and the output member 30. The annular coupling element 40 has its outer surface formed with multi-start helical gear teeth 42 in non-locking engagement with the helical gear teeth 25 of input member 20. The end face of annular coupling element 40 adjacent output member 30 is formed as a radial clutch face 45 by a plurality of radiating groove-and-ridge corrugations of V-shaped cross-section (corresponding to the radiating corrugations of clutch face 35) and is urged into clutching engagement of clutch face 35 by a conical spring 44 acting between a reaction member 46 and an inner ring portion 47 of the annular coupling element 40. The reaction member 46 has a frusto-conical portion extending between its end portions 48 and 49, the end portion 48 being formed as a cylinder extending axially within the inner ring portion 47 of annular coupling element 40, and the end portion 49 being formed as an annular flange-like plate extending radially across the bores 18 of shaft 13 and the step formed by surfaces 24, 26 of input member 20. The cylindrical end portion 48 is disposed for abutment by a washer 50 engageable on one side by the dowel pins 34 and on the other side by the inner ring portion 47 of coupling element 40. The radial-plate end portion 49 is engageable by pins 52 extending through the bores 18 into the annular recess 19 of shaft 13.

A cap member 55 which as will be seen hereafter acts as a clearance control element of a clearance sensing means of the slack adjuster mechanism, (see FIG. 5) having a peripheral wall 54 and an annular bight wall 53 is fitted over the end of hub 23 of input member 20 remote from output member 30. A central tubular part 56 extends from the annular bight wall 53 in the same direction as, and beyond the extremity of, wall 54 so as to enter the annular recess 19 of hub 23 as a rotatably bearing fit with the inner wall of recess 19. The free end of tubular part 56 is provided with a plurality of equi-angularly spaced, axially-directed slots 57. The cap member 55 is formed integrally with two diametrically opposite lugs 58 located internally in the arris between peripheral wall 54 and bight wall 53, and the peripheral wall 54 is externally provided with an integral lug 59, e.g. in the same diametral plane as internal lugs 58. An elongate coil spring 8 (see FIG. 6) extends in an arcuate, almost semi-circular path between each internal lug 58 and respectively each lug 28 of the hub 23 so as to urge the lugs 28, 58 of each pair towards one another.

A clutch 60, the details of which form no part of the invention, is provided in recess 19 by a plurality of generally annular clutch plates alternative ones of which are rotationally fast with the shaft 13 and the cap member 55. For convenience, this clutch 60 is illustrated rather diagrammatically as composed of two clutch plates 61, 62. One clutch plate is provided on its outer periphery with equi-angularly spaced cut-outs of semi-circular cross-section so as to be keyed by the pins 52 to the shaft 13. The other clutch plate is provided on its inner periphery with equi-angularly spaced ears that extend into the slots 57 of the cap member's tubular part 56. The clutch plate 62 is urged into engagement of clutch plate 61 by spring washers 64 (e.g. Schnorr washers) housed in the recess 19 and acting between plate 62 and a retaining circlip (not shown).

The external lug 59 of cap member 55 is housed in an arcuate slot 65 provided by a shroud member 66 bolted to the elongate frame member 11b. The effective length of the arcuate slot 65 is adjustable by a screw 9 (see FIG. 6), and provides a predetermined distance corresponding to the required clearance between the brake block or pad and the wheel or disc.

A piston-cylinder arrangement (not shown), constituting a brake force actuator, is coupled to one of the holes 22 of input member 20, the holes 38 through the bifurcated lever arm 31 of output member 30 being connected via rigging to one end of a brake force applying member carrying at its other end the brake block or pad for engagement of the wheel or disc to be braked. In the exemplary friction brake apparatus illustrated schematically in FIG. 6, two brake force applying members 67 are provided as the arms of a caliper, one of such arms being connected to the bifurcated lever arm 31 of output member 30 and the other being attached to a fixed point on the railway vehicle chassis; and the two brake blocks or pads of friction material being arranged to engage respective discs 69 attached to the wheel of the railway vehicle.

In operation, when the cylinder offset arrangement is supplied with a pressure fluid medium (e.g. compressed air), the arrangement's piston causes the lever arm 21 to move and rotate hub 23 about the axis of a pin 12. Since the clutch plates 61 and 62 are in force-transmitting clutching engagement under the action of spring washers 64, the initial rotation of hub 23 causes the cap member 55 to rotate therewith. As the input member 20 moves, a reaction force tends to be created between the threads 25, 42 in a direction tending to separate or move apart the input and output members 20 and 30 due to the interengagement of clutch faces 35, 45 of the output member and coupling element 30 and 40. This results in a tendency to create a reaction force between the input member 20 and the end portion 49 of reaction member 46, between reaction member 46 and pins 52, between pins 52 and plate 62, and between plate 62 and the spring washers 64. The spring washers 64 are designed to have an inherent resilience sufficient to resist the normal reaction forces arising from rigging friction and so that the plates of clutch 60 will remain in mutual binding engagement until the brake blocks or pads 68 contact the wheel or discs 69. Such contact only occurs when the spacing between the brake blocks or pads 68 and the wheel or discs 69 is taken up. Where this spacing exceeds the nominal clearance desired (e.g. after the brakes have been re-blocked), the instant of such contact will only occur after the cap member 55 has ceased to rotate in unison with the input member 20 due to the cap member's external lug 59 abutting the end of slot 65 provided by the screw 9 (see FIG. 6). The cap member 55 is therefore part of a clearance sensing means. When the cap member 55 is stopped in such a case, the reaction forces between the coupling element 40 and the hub 23 are increased and the engagement force between clutch faces 35, 45 is also increased. Accordingly, there is an increase in the reaction forces acting via hub 23, reaction member 46, pins 52 and plate 62 sufficient to reduce the clutching forces acting on the plates of clutch 60 by spring washers 64, and permit slipping of clutch 60. With the brake blocks or pads 68 in contact with the wheel or discs 69 and a sensible brake force applied between them (by a torque transmission from hub 23 to hub 33 via coupling element 40), these reaction forces become sufficient to disengage fully the clutch 60.

The relative disposition of the lugs 28 and 58 is such that, on a brake application, the lugs 28 lead the lugs 58, the lug pairs 28,58 moving in unison during the initial motion of the hub 23 until the cap member 55 is stopped by its external lug 59 engaging the end of slot 65 provided by screw 9, and the lugs 28 thereafter moving away from the lugs 58 against the action of coil springs 8. It will be appreciated that the degree of separation between the lugs 28 and 58 is a measure of the excess clearance.

To release the brakes, i.e. effect a withdrawal of the brake blocks or pads 68 from the wheel or disc 69, the fluid pressure in the cylinder of said piston-cylinder arrangement is reduced so as to initiate return movement of the input member 20 towards its initial start position. This return movement reduces the forces acting between the brake blocks or pads 68 and the wheel or discs 69, but (apart from movement due to strain recovery) leaves the output member in its brake applied position until the brake blocks or pads 68 are about to move away from their contact of the wheel or discs 69. When such contact is about to cease, the reaction forces acting via parts 23, 46, 52, and 61, 62 are at a reduced level permitting the spring washers 64 to move plate 62 such that the clutch 60 re-engages. Further return movement of the input member 20 then carries the cap member 55 back through the predetermined distance of slot 65 (which corresponds to the desired clearance between the brake blocks or pads 68 and the wheel or discs 69), the coil springs 8 acting between the lug pairs 28, 58 to ensure that the cap member 55 does not return prematurely, i.e. before the brake blocks or pads 68 are just about to leave the wheel or discs 69 and the clutch 60 has re-engaged. As the input member 20 returns with the cap member 55, the shaft 13 and output member 30 return therewith until they are stopped, by the external lug 59 engaging the end of slot 65 remote from screw 9, thus leaving the output member 30 in the appropriate new position providing the desired nominal clearance between the brake blocks or pads 68 and the wheel or discs 69. Thereafter, the brake force actuator continues to pull the input member 20 further back to its initial start position, in effect relieving and "reversing" the reaction forces acting between gear teeth 25 and 42. This change in the reaction forces between gear teeth 25,42 tends to disengage and re-engage intermittently the clutch faces 35, 45 to permit ratcheting rotation of the coupling element 40 (to which the input member 20 is helically splined by the interengaged gear teeth 25, 42) relative to the output member 30 until the input member 20 returns to its initial start position with the output member 30 remaining in the new position relative to the input member 20 and the coupling element 40, the latter being finally left engaged with the output member 30 via clutch faces 35, 45.

From the foregoing it will be appreciated that during a brake application, the parts 20, 30 and 40 are locked together and in effect operate as a single, rigid, brake-force-transmitting component. The angular motion of this "component" is continued until the brake block or pads 68 engage the wheel or discs 69 to be braked, whereafter the braking force supplied by the brake force actuator is transmitted by to the brake force applying member(s) 67 to effect the braking. Where the clearance between the brake block or pad and the wheel or disc is at the nominal clearance desired, such engagement occurs just as the external lug 59 of cap member 55 engages the end of slot 65 provided by the adjusting screw 9. The condition shown in FIG. 6 where this clearance exceeds the nominal clearance desired, e.g. after re-blocking of the brakes, such engagement occurs after the lug 59 has engaged said screw-defined end of slot 65, the slipping of clutch 60 and the relative movement of lugs 28, 58 against the force of the springs 8 between them, permitting the requisite lost motion between cap member 55 and input member 20. When the pressure in the cylinder is relieved to release the brakes, then (assuming the clearance traversed during brake application was greater than the nominal clearance required) the input lever 20 begins to rotate in the opposite direction but, apart from strain movements, causes no corresponding return rotation of the output member 30 until the brake block or pads 68 are about to become disengaged from the wheel or discs 69 (the rigging friction having been overcome) and the reaction forces till then acting to disengage clutch 60 are relieved so as to permit re-engagement of clutch 60 and thereby movement in unison of the output member 30, shaft 13, cap member 55 and the input member 20 until the cap member 55 returns to its initial start position with external lug 59 engaging the end of slot 65 remote from screw 9. The nominal clearance desired will thus be reset and the slack adjuster 10 will have "gulped" or taken up in a single brake operation (i.e. application and release) all of any excess clearance.

To reset the slack adjuster 10 preparatory to re-blocking of the brakes, the clutch 60 and clutch 35,45 are each disengaged to permit mutual relative rotation (e.g. by hand) of input and output members 20 and 30 to their respective relative start or pre-use positions. This clutch disengagement is achieved by moving the dowel pins 34 to the right (as viewed in FIG. 1) thereby to move likewise the washer 50. By its engagement of inner ring portion 47 of the coupling element 40, such rightwards movement of washer 50 causes the coupling element 40 to move away from output member 30 and separate or de-clutch their respective endfaces 45 and 35. As it moves onwards to the right (as viewed in FIG. 1), the washer 50 also engages the cylindrical end 48 of reaction member 46 to move the latter in the same direction. The opposite annular flange-like end 49 of reaction member 46 thus causes the pins 52 to move pressure plate 63 against spring washers 64 thereby to remove the latter's action upon the clutch plates of clutch 60 which is thus disengaged. The initial rightwards movement of the dowel pins 34 may for example be accomplished by two levers 71 each having one end engaging in a slot in a respective dowel pin 34 with its other end engaged in a groove in a resetting lever 72 that is rotatably mounted in the output member 30. Rotation of lever 72 in the direction of arrow 73 (FIG. 7) effects a camming action between the grooves in lever 72 and the ends of levers 71 engaged therein, and thus causes each lever 71 to rock about a fulcrum portion provided between its ends thereby to impart a corresponding push action upon the dowel pin 34 engaged therewith. The lever 72 can also be used to rotate the output member 30 in its rotational plane about the axis of pin 12, this being achieved by moving the lever 72 in the direction (FIG. 7) orthogonal to its initial clutch disengaging direction of arrow 73. Alternatively, the initial rightwards motion of dowel pins 34 may for example be accomplished by engaging the left-hand ends of the dowel pins 34 by the limbs of a generally U-shaped member, the limbs being somewhat lozenge-shaped in side view to provide fulcrum portions, and the yoke of the generally U-shaped member being engageable by a rotatable resetting lever (similar to the resetting lever 72) providing a camming action on said yoke. After rotating the resetting lever to effect clutch disengagement, the same lever may be rotated about an axis perpendicular to the axis of its initial rotation thereby to rotate the output member 30 about the axis of pin 12 with a view to return the output member 30 to its intended start position.

I claim:

1. Slack adjusting means to provide for automatic slack adjustment or compensation along an arcuate path, the slack adjustment means comprising an input member movable arcuately in a first plane, an output member movable arcuately in a second plane parallel to or coplanar with the first plane, and a coupling element for transmitting a braking force from the input member to the output member, characterised in that the input and output members are constrained against relative displacement in a direction transverse to the said first and second planes, and in that the element is positively engaged with one of said members via co-operating helical engagement means (e.g. helical keying means) and the element is engageable or engaged with the other of said members via co-operable clutch faces arranged to be retained in force-transmitting engagement by the reaction forces in the co-operating helical engagement means when the said members tend to rotate relatively in one direction, and to be disengageable as said reaction forces are removed or relieved when the said members tend to rotate relatively in the opposite direction thereby to permit relative rotation, corresponding to the slack to be taken up, between said element and said other member.

2. Slack adjusting means according to claim 1, characterised in that the input member and the output member are each angularly movable about a common axis, and in that the coupling member is movable longitudinally of said common axis to disengage said co-operable clutch faces.

3. Slack adjusting means according to claim 1 or claim 2, characterised in that one member has a tubular portion formed internally with a helical groove or projection co-operating with a corresponding helical projection or groove formed on the outer surface of the coupling element, the said element being disposed within the tubular portion with a radial end face of said element adjacent a radial end face of the other member, the two said radial end faces constituting the aforesaid clutch faces and the cooperating groove and projection constituting the aforesaid helical engagement means.

4. Slack adjusting means according to claim 1 or claim 2, characterised in that one member has a tubular portion formed externally with a helical groove or projection co-operating with a corresponding helical projection or groove formed on the inner surface of the coupling element, the latter encompassing the tubular portion with a radial end face of said element adjacent a radial end face of the other member, the two said radial end faces constituting the aforesaid clutch faces and the co-operating groove and projection constituting the aforesaid helical engagement means.

5. Slack adjusting means according to claim 1, characterised in that said one member is constituted by the said input member and in that said other member is constituted by the said output member.

6. Slack adjusting means according to claim 1, characterised in that said one member is constituted by the said output member and in that the said other member is constituted by the said input member.

7. Slack adjusting means according to claim 1, characterised by the provision of clearance sensing means to sense that a predetermined clearance between a brake block or pad and a wheel or disc has been reached during release of the brakes.

8. Slack adjusting means according to claim 7, characterized in that the clearance sensing means comprises a clearance control element, a clutch to couple the clearance control element to one of said members for movement therewith, and disengagement means for disengaging said clutch and thereby permit relative movement between the clearance control element and said one member, the disengagement means being sensitive to the reaction forces acting to constrain the input and output members against said relative displacement and being operable to disengage said clutch when these reaction forces exceed a predetermined value.

9. Slack adjusting means according to claim 8, characterized in that the said one member to be coupled by said clutch to the clearance control element is constituted by said input member.

10. Slack adjusting means according to claim 1, characterized in that the helical engagement means comprises helical keying means formed by helically interengaged grooves and projections respectively provided by gear teeth in mesh with one another.

11. Slack adjusting means according to claim 1, characterized in that the helical engagement means comprises helical keying means formed by helically interengaged grooves and projections respectively provided by cooperating grooves and splines or keys.

* * * * *